United States Patent [19]
Tanaka et al.

[11] Patent Number: 5,323,607
[45] Date of Patent: Jun. 28, 1994

[54] EXHAUST EMISSION CONTROL SYSTEM AND METHOD HAVING IMPROVED HEATING CONTROL FUNCTION FOR CATALYST

[75] Inventors: Hiroshi Tanaka, Susono; Kouji Yoshizaki, Numazu, both of Japan

[73] Assignee: Toyota Jidosha Kabushiki Kaisha, Toyota, Japan

[21] Appl. No.: 22,247

[22] Filed: Feb. 25, 1993

[30] Foreign Application Priority Data

May 14, 1992 [JP] Japan ............................. 4-122191

[51] Int. Cl.$^5$ ............................................. F01N 3/28
[52] U.S. Cl. ................................... 60/274; 60/284; 60/286; 60/300
[58] Field of Search ................ 60/274, 284, 286, 300

[56] References Cited

U.S. PATENT DOCUMENTS

| | | | |
|---|---|---|---|
| 3,723,070 | 3/1973 | Houdry | 60/300 |
| 4,698,966 | 10/1987 | Distel | 60/286 |
| 5,224,335 | 7/1993 | Yoshizaki | 60/300 |
| 5,257,501 | 11/1993 | Wataya | 60/284 |

FOREIGN PATENT DOCUMENTS

| | | |
|---|---|---|
| 22313 | of 1972 | Japan . |
| 25514 | of 1972 | Japan . |
| 124412 | of 1974 | Japan . |
| 15421 | 1/1989 | Japan . |
| 500911 | 2/1991 | Japan . |
| 504405 | 9/1991 | Japan . |
| 136413 | 5/1992 | Japan . |

Primary Examiner—Douglas Hart
Attorney, Agent, or Firm—Kenyon & Kenyon

[57] ABSTRACT

A catalyst purifies an exhaust gas exhaled from an internal combustion engine by catalysis thereof as a result of the exhaust gas passing therethrough. A heating unit heats the catalyst so as to cause the catalyst to perform the desired catalysis. A temperature detector detects the temperature of the catalyst. A deriving unit derives a required heat energy quantity to be applied to the catalyst, by which the temperature of the catalyst reaches an activating temperature so as to perform the desired catalysis, according to the temperature of the catalyst detected through the temperature detector before the internal combustion engine starts. A heat control unit causes the heating unit to stop the heating of the catalyst after the required heat energy has been applied to the catalyst.

28 Claims, 11 Drawing Sheets

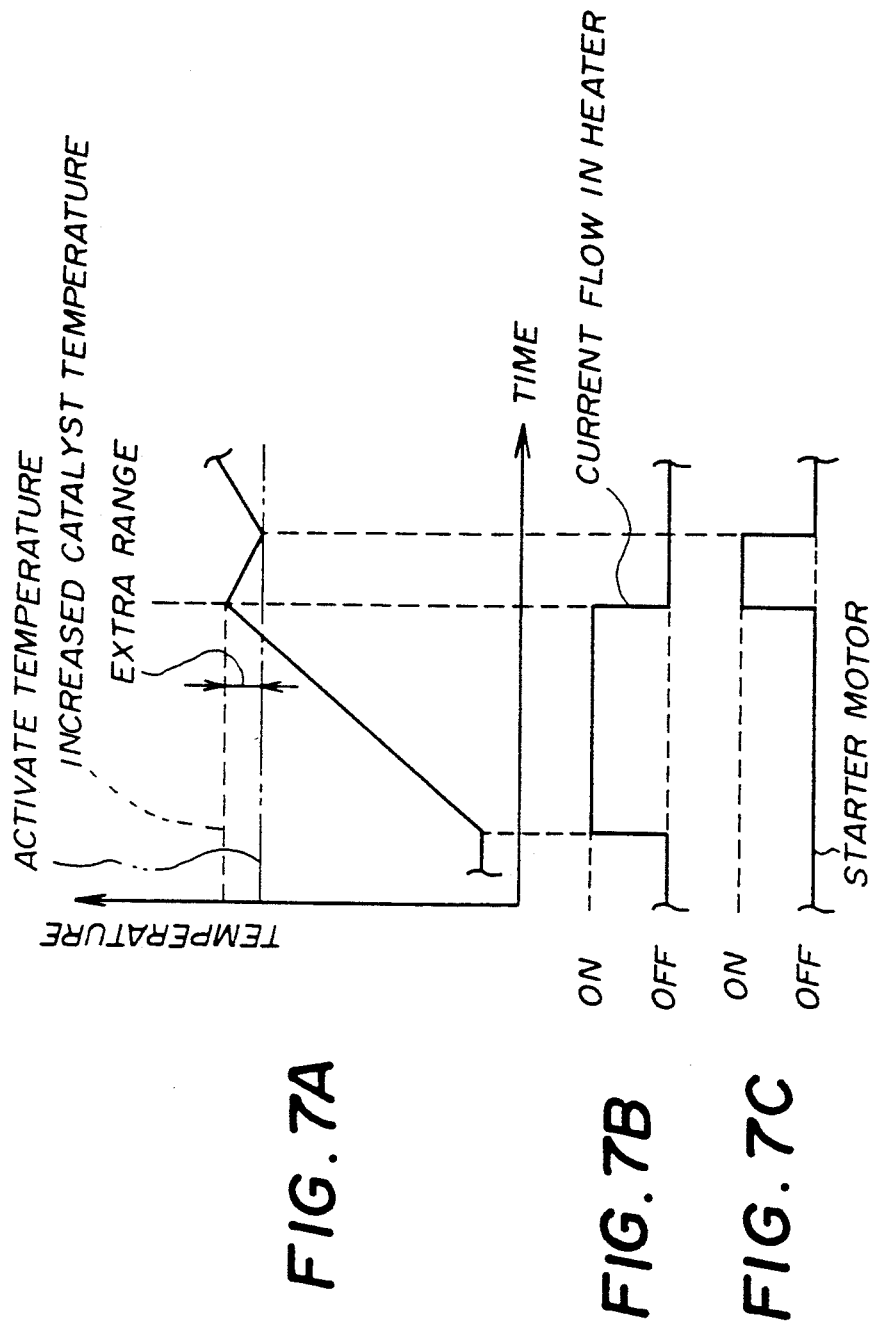

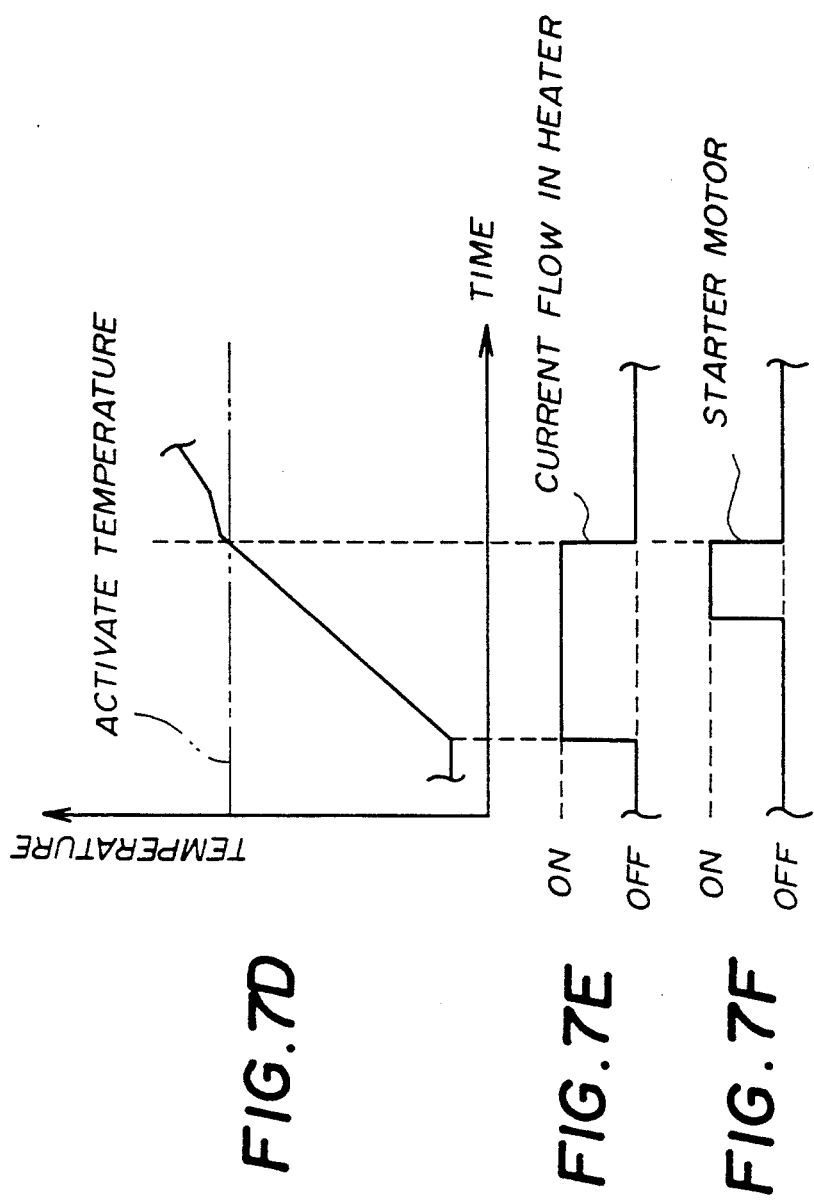

EXHAUST EMISSION CONTROL SYSTEM AND METHOD HAVING IMPROVED HEATING CONTROL FUNCTION FOR CATALYST

BACKGROUND OF THE INVENTION (1) Field of the Invention

The present invention relates to exhaust emission control system and method, particularly relating to an exhaust emission control system for an internal combustion engine which facilitates warming a catalyst up by causing a heater to function, which catalyst has the heater attached thereto.

(2) Description of the Related Art

Generally speaking, a catalyst used for controlling exhaust emission cannot be activated and thus the necessary purifying function cannot be obtained unless the temperature thereof reaches a predetermined value. The catalysis used for the internal combustion engine is heated by exhaust gas provided therefrom. However, in a case where the internal combustion engine is started when the ambient temperature is not high enough, the temperature of the exhaust gas is thus not high enough, further the engine has not been warmed up yet and combustion efficiency is thus not yet high. Therefore, purifying the exhaust gas by the catalyst is difficult in that case.

The Japanese Utility Model Laid-Open Application No. 49-124412 discloses an exhaust emission control system of a related art, which system has a heater for heating a catalyst, the heater heating the catalyst, a temperature sensor then detecting when the temperature of the catalyst reaches a temperature in an activating temperature range, that is, a range in which the catalyst is activated, the heater then stopping the heating of the catalyst in response to an output from the temperature sensor.

Such a system of the related art is needed to heat a catalyst appropriately so as to reach a temperature in the activating temperature range in any condition, a high detecting accuracy and a very fast response being thus required for a temperature sensor to be used for detecting the temperature of the catalyst in the exhaust emission control system in the related art.

For the purpose of the high detecting accuracy and very fast response in the temperature sensor, the temperature sensor is located on the back of the catalyst, the temperature on the back of the catalyst reaching an extremely high temperature, so as to expose the sensor directly to the exhaust gas, in the system of the related art. Further, a thermocouple is employed for the temperature sensor, such a thermocouple having an excellent response time in the system. However, such a thermocouple, although it has an excellent response time, is inferior in view of durability thereof, in comparison to another temperature sensor such as a thermistor. Particularly in the above-mentioned extreme circumstances, a problem such as the snapping of a wire may occur in the thermocouple accordingly.

A problem occurring in the temperature sensor results in continuous heating of the catalyst by the heater, causing further problems such as the catalyst being excessively heated, or damaged. Another problems in which the catalyst is not heated so as to be activated sufficiently and the sufficient purifying of the exhaust gas cannot be achieved may occur as a result of the temperature sensor failure.

SUMMARY OF THE INVENTION

An object of the present invention is to provide an exhaust emission control system which heats a heater-attached catalyst, appropriately independent of the response time of a temperature sensor.

To achieve this object, an exhaust emission control system comprises:

catalyst means for purifying exhaust gas exhaled from an internal combustion engine by catalysis thereof as a result of the exhaust gas passing therethrough;

heating means for heating the catalyst means so as to cause the catalyst to perform the desired catalysis;

temperature detecting means for detecting the temperature of the catalyst means;

deriving means for deriving the required heat energy to be applied to the catalyst means, by which the temperature of the catalyst reaches an activating temperature so as to perform the desired catalysis, based on the temperature of the catalyst detected through the temperature detecting means before the internal combustion engine starts; and heat control means for causing the heating means to stop the heating of the catalyst after the heat energy having been applied to the catalyst means has reached said required heat energy obtained by the deriving means.

By the above-mentioned configuration, the temperature detection of the catalyst at the steady state of the engine is enabled. Thus, a temperature detecting means having a relatively lower grade in response time thereof, such as a thermistor, can be employed in the exhaust emission control system. Further, the temperature detecting means employed by the exhaust emission control system does not need to be directly exposed to the exhaust gas. Thus, the durability of the temperature detecting means can be improved, and the reliability of the exhaust emission control system can be also improved.

Other objects and further features of the present invention will become more apparent from the following detailed description when read in conjunction with the accompanying drawings.

BRIEF DESCRIPTION OF THE DRAWINGS

FIGS. 7A through 7F show temperatures of the heater attached catalyst and current flowing timings, and cranking timings of a starter motor;

DESCRIPTION OF THE PREFERRED EMBODIMENTS

Figure 1:
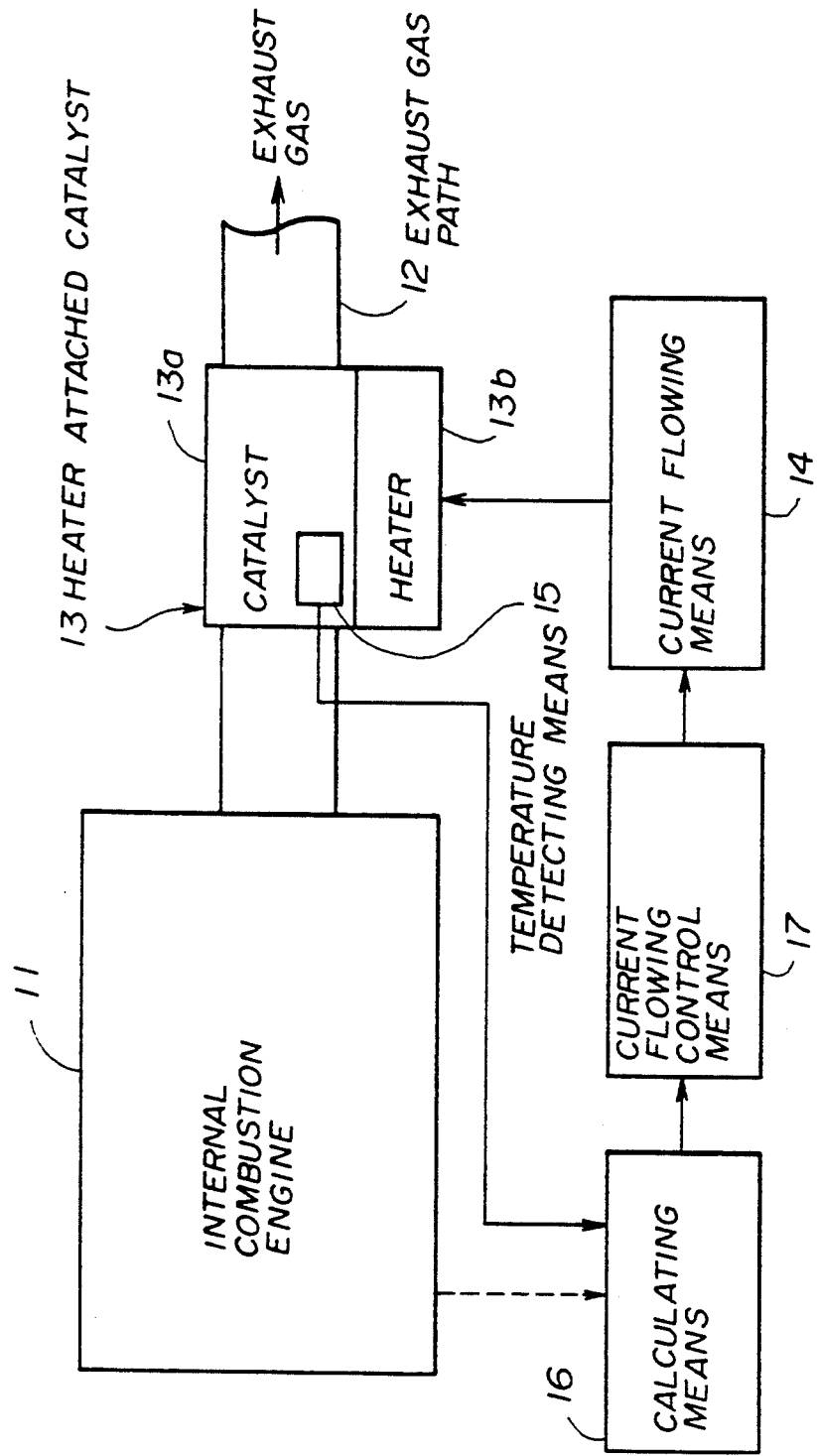
FIG. 1 shows principles of an exhaust emission control system according to the first though fourth embodiments of the present invention.

Principles of an exhaust emission control system according to the first through fourth embodiments of the present invention will be described now with reference to FIG. 1. The exhaust emission control system has a heater-attached catalyst 13 which has a catalyst 13a which performs catalysis, the catalysis purifying an exhaust gas, and a heater 13b which heats the catalyst 13a as a result of a current flowing means 14 causing an electrical current to flow through the heater 13b.

The exhaust emission control system further has: a temperature detecting means 15 for detecting the temperature of the catalyst 13a; calculating means 16 for calculating the required current flowing time based on the temperature of the catalyst 13a, which temperature is detected through the temperature detecting means 15 before starting of an internal combustion engine 11; and current flowing control means 17 for causing the current flowing means 14 to stop an electric current flowing through the heater 13b after the required current flowing time has elapsed since the current flowing means 14 started causing the electric current to flow through the heater 13b or the current flowing control means 17 causes the current flowing means to stop an electric current flowing through the heater 13b depending on other conditions as described below.

The required current flowing time determined as a result of calculation by the calculation means 16 is not a predetermined time. The required current flowing time is variable depending on the temperature of the catalyst 13a obtained as a result of detection through the temperature detecting means 15. Further, the calculating means 15 determines the required current flowing time as a result of the assumption that the temperature of the catalyst 13a will reach a predetermined temperature as a result of the electric current flowing through the heater for the determined required current flowing time. The catalyst 13a, when its temperature reaches the predetermined temperature, performs the desired catalysis for purifying the exhaust gas.

Further, the temperature detecting means 15 detects the temperature of the catalyst 13a before the engine 11 has been started, the temperature then being in a steady state. Thus, the temperature sensor detecting such a temperature does not need to be one having an excellent response. Further, the required current flowing time determined as a result of calculation by the calculating means 16 does not depend on the response of the temperature sensor 15.

Further, the current flowing control means 17 controls the current flowing means 14 so as to cause the electric current to flow in the heater 13b for the required current flowing time which has been determined as a result of calculation by the calculating means 16. Thus, the temperature of the catalyst 13a reaches the predetermined temperature in any case not depending to the response of the temperature sensor 15.

A construction of one example of an exhaust emission control system, which construction may be employed by the exhaust emission control system according to the first through fourth embodiments of the present invention will be described now with reference to FIG. 2. A combustion chamber of an internal combustion engine 21 is connected to an exhaust path 21 though an exhaust valve, both the combustion chamber and the exhaust valve not being shown in FIG. 2. The exhaust path 22 is connected to a heater-attached catalyst 24, wherein an air inlet port (AI port) 23 is provided at the outlet side of the exhaust path 22, and the heater-attached catalyst 24 is located in the downstream side of the AI port 23.

The AI port 23 is opened when the internal combustion engine 21 is started in a case where the ambient temperature is not high enough, such as in cold weather conditions, so that the AI port 23 causes air to flow into the downstream side of the exhaust path 22. When the internal combustion engine 21 is started in a case where the ambient temperature is not high enough, such as in cold weather conditions, incomplete combustion occurs until the engine 21 is warmed up sufficiently, incomplete combustion compositions being thus included in the exhaust gas. The AI port 23 provides air necessary to burn the incomplete combustion compounds.

A start catalyst 25 and a main catalyst 26 are provided in the downstream side of the heater-attached catalyst 24, the start catalyst 25 being located the next to the heat attached catalyst 24 and the main catalyst 26 being located the next to the start catalyst 25. The start catalyst 25, having a relatively small capacity, has the function of removing poisonous compounds included in the exhaust gas immediately while the engine 21 is in a cold state soon after it has been started. The exhaust emission control system of FIG. 2 purifies the exhaust gas efficiently through the catalysis by these three catalysts 24, 25 and 26.

The heater-attached catalyst 24 has both a positive electrode 27 and a negative electrode 28. Further, the heater-attached catalyst 24 has a temperature sensor 29 made of a thermistor for detecting the temperature of the catalyst, the temperature sensor 29 acting as the above-mentioned temperature detecting means 15.

A battery 30 acts as the above-mentioned current flowing means 14, the negative electrode 28 and a negative electrode of the battery being connected, and the positive electrode 27 and an output terminal of a controller 31 are connected to each other. The controller 31 acts as the above-mentioned calculating means 16 and the above-mentioned current flowing control means 17, and the controller 31 provides electric power to the positive electrode 27 as a result of being connected to the positive terminal of the battery 30.

The terminal voltage of the catalyst 24 is input to the controller 31 from the positive and negative electrodes 27 and 28 through lines 32, and the terminal voltage of the battery 30 is input through lines 33. Further, the controller 31 is connected to an electrical control unit (ECU) 34 and the starter relay 35. The controller 31 then controls current flowing through the heater-attached catalyst 24 and controls the switching on and off of the starter relay 35.

A construction of one example of the heater-attached catalyst 24 will be detailed with reference to FIG. 3. In FIG. 3, the corresponding same reference numerals are assigned to the parts substantially the same as those in FIG. 2, and the corresponding description for the parts will be omitted.

The heater-attached catalyst 24 and the starter catalyst 25 are provided in the case 36, the catalysts being located along the flowing direction D of the exhaust gas. The heater-attached catalyst 24 comprises a metal monolith catalyst made of a spiral shaped wound metal monolith substrate that has been coated with a gamma alumina that acts as an insulation material. The heater-attached catalyst 24 has a center axis 27a which is electrically connected to the positive electrode 27 located along a center line extending along the exhaust gas flowing direction D. The heater-attached catalyst 24 further has an outer pipe 28a which is electrically connected to the negative electrode 28.

In the above-mentioned construction of the heater-attached catalyst 24, as a result of a voltage being applied between the positive and negative electrodes 27 and 28, an electric current flows from the center axis 27a to the outer pipe 28a along a spiral shaped path. The catalyst is then heated as a result of the electric current flowing, the temperature of the catalyst then reaches the above-mentioned activating temperature range, and the catalyst then reduces hydrocarbons (HC) and/or carbon-monoxides (CO) included in the exhaust gas.

The temperature sensor 29 is provided integrally with the negative electrode 28, and measures the temperature of the outer pipe 28a. In this construction, the temperature sensor 29 is not exposed to the exhaust gas directly. Further, the temperature sensor 29 used in the example is made of a thermistor, and is thus superior in durability under a high temperature conditions. Thus the temperature sensor has a high reliability in comparison to that used in a conventional exhaust emission control system. Further, a short circuit failure occurring at the temperature sensor 29 as a result of a short circuit occurring between the sensor 29 and the ground is prevented because the sensor 29 is attached to the negative electrode 28 that is grounded.

Further, the start catalyst 25 made of a monolith catalyst such as mentioned above is provided at the downstream side of the heater-attached catalyst 24. The start catalyst 25 has a tandem construction in which: two monolith catalysts are provided located adjacent to each other; a predetermined space S is provided between the two catalysts; and the two catalysts are arranged along the exhaust gas flowing direction D. In the tandem construction, an efficient purifying of the exhaust gas can be performed.

Figure 4:
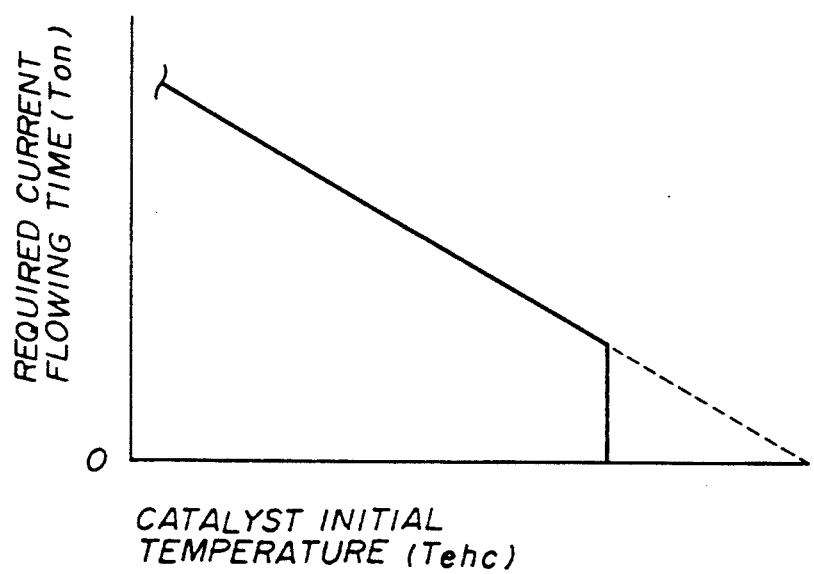
FIG. 4 shows a graph of a relationship between the initial temperature of a heater attached catalyst and the required current flowing time for causing the temperature of the catalyst to reach the activating temperature range, which catalyst may be used in an exhaust emission control system according to the first through third embodiments of the present invention.

A relationship between the initial temperature of the heater-attached catalyst 24 that may be used in the exhaust emission control system according to the first through third embodiments of the present invention and the required current flowing time required for the temperature of the heater-attached catalyst 24 to reach the activating temperature range will be described with reference to FIG. 4.

If the set temperature of the heater at which the catalyst is activated is referred to as Tact, the required time Ton by which the heater reaches the set temperature Tact can be obtained by the following equation:

$$Ton = (C/W) \cdot (Tact - Tehc) \quad (1),$$

where W represents the electrical power consumed by the heater of the heater-attached catalyst 24; C represents the heat capacity of the heater-attached catalyst; and Tehc represents the initial temperature.

The three parameters, namely the consumed power W, the heat capacity C and the activating temperature Tact are fixed values respectively. Thus, the current flowing time Ton is determined from the initial temperature Tehc of the heater-attached catalyst 24 without ambiguity, and the relationship between them can be represented by a line having a negative slope as shown in FIG. 4. The broken line in FIG. 4 represents the temperature range in which the initial temperature Tehc of the catalyst is sufficiently high, and thus current flowing through the heater is not needed. Thus, in the emission control systems according to the first through third embodiments of the present invention, the current flow is cut off in the temperature range shown in the broken line in FIG. 4.

Now, the operation flow of processes employed by the emission control systems according to the first through fourth embodiments of the present invention in which the controller 31 acts as the calculating means 16 and the current flowing means 14 in the exhaust emission control system shown in FIG. 2 will be described now.

Figure 5A:
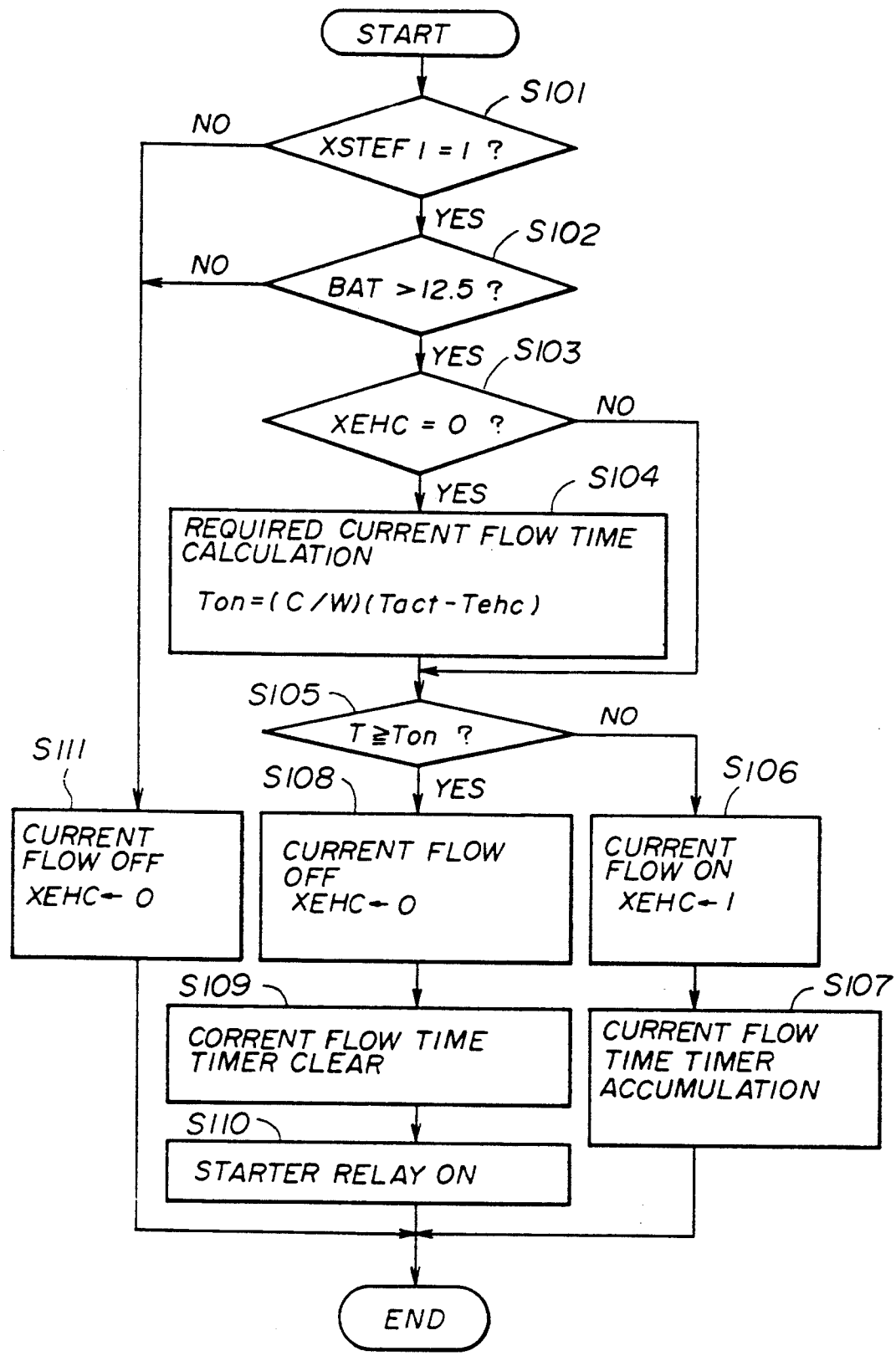
FIG. 5A shows a flow chart of processes executed in an exhaust emission control system according to the first embodiment of the present invention.

The operation flow of the processes employed by the emission control system according to the first embodiment of the present invention will be described now with reference to FIG. 5A. After the ignition switch of the internal combustion engine 21 is turned ON, the processes shown in FIG. 5A are executed periodically with a cycle of a predetermined duration. Whether or not the engine 21 is in a stop state is determined step S101 (hereinafter, the term "step" is omitted so that, for example, "S101" represents "the step S101).

In a case where the engine 21 is in the stop state (the stop state is represented by XSTEF1 flag being "1"), it is determined that heating of the catalyst is necessary, and then it is determined whether or not the battery voltage is normal (S102).

Figure 2:
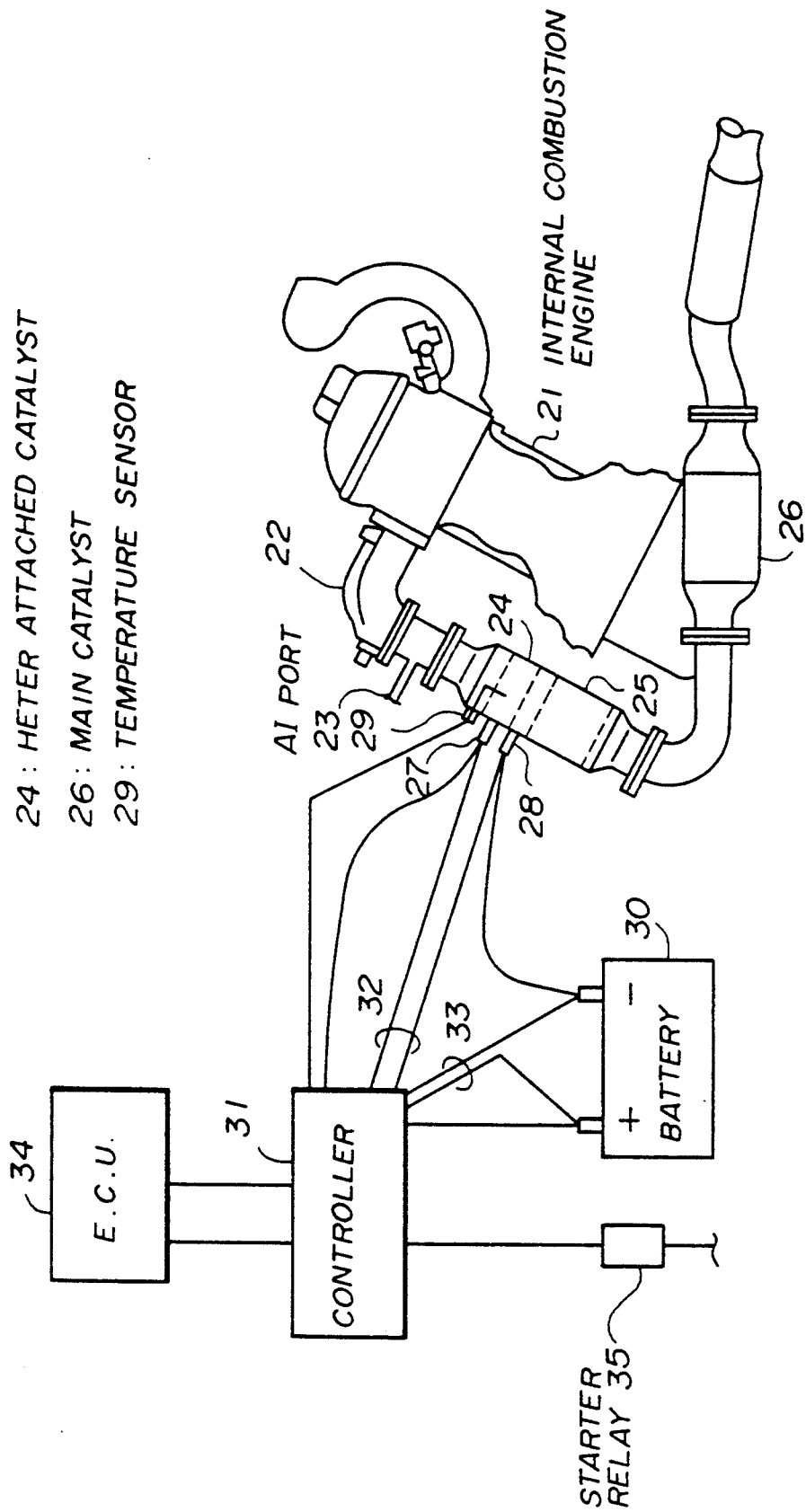
FIG. 2 shows a configuration of one example of an exhaust emission control system that may be employed by the exhaust emission control systems according to the first through fourth embodiments of the present invention.
Figure 3:
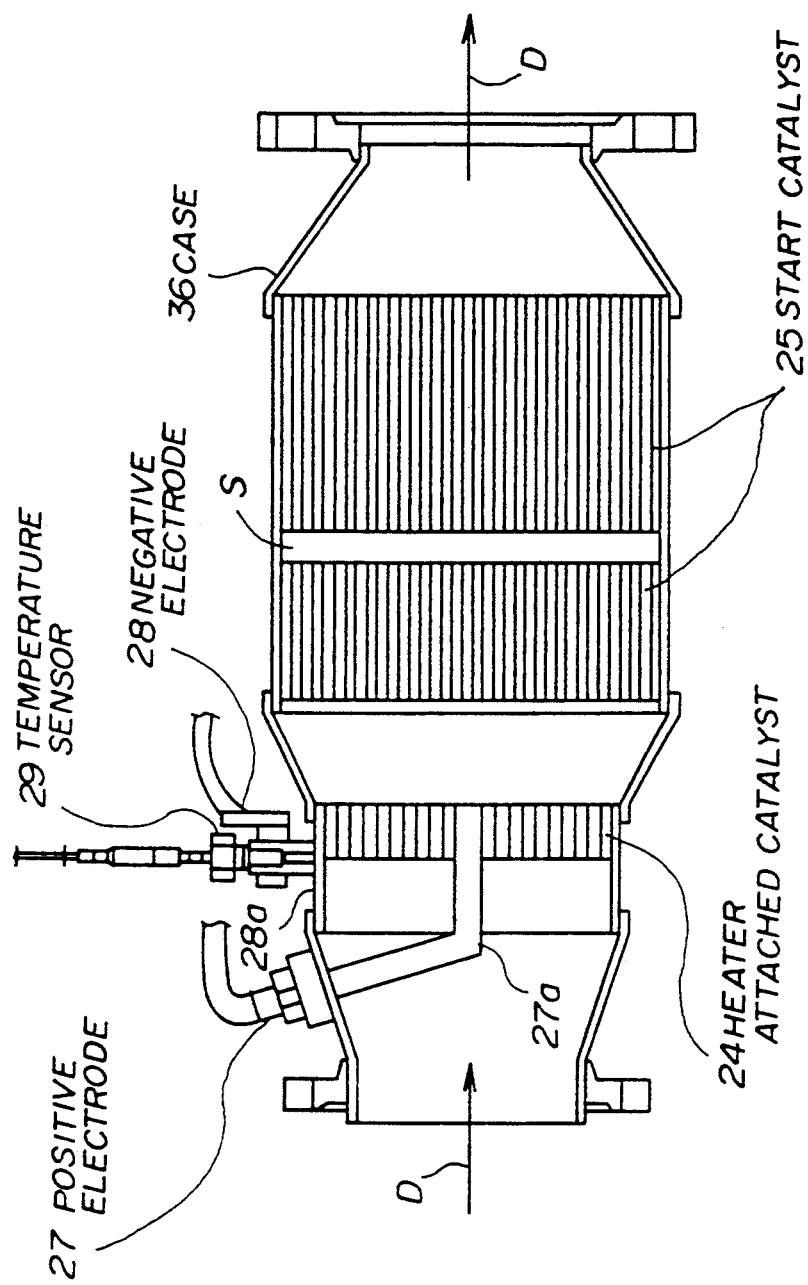
FIG. 3 shows a front sectional view of one example of a heater-attached catalyst that may be employed in the exhaust emission control systems according to the first through fourth embodiments of the present invention.

In a case where the battery voltage detected through the lines 33 in FIG. 2 is higher than 12.5 V (BAT>12.5), S103 is executed. In the case where the battery voltage is not higher than 12.5 V in S102, it is determined that the battery 30 has been weakened, and then the electric current does not flow through the heater so as to save the electric power, then a flag XEHC that represents the current flowing state is set to "0" (S111), and the current processing cycle is then finished.

In S103, whether or not the electric current has already flowed through the heater-attached catalyst 24 is determined. The determination is executed as a result of detecting the electric potential between the positive electrode 27 and the negative electrode 28 of the heater-attached catalyst 24 obtained through the output of the lines 32.

In a case where the current has not yet flowed through the heater-attached catalyst 24 (thus the XEHC flag is "0"), it is determined that the current cycle is the first one, then the next step is executed. Thus, the required time Ton required for increasing the temperature of the heater-attached catalyst 24 to the activating temperature range is calculated (S104). The calculation is executed by substituting the Tehc previously detected through the temperature sensor 29 into the above-mentioned equation (1) indicating the relationship between the Ton and the Tehc.

Then, whether or not the required current flowing time has elapsed is determined (S105) as a result of comparing a counted value T of a current flow time timer with the Ton, the counted value T being obtained as a result of counting in S107 as described below. Because the current processing cycle is the first processing cycle, it is determined that the required current flowing time has not yet elapsed (T<Ton), and thus the current flows through the heater of the heater-attached catalyst, the flag XEHC thus being set to "1" (S106).

Then, after the current flows in the heater and the flag XEHC is set to "1", a predetermined value is added to the value T of the current flow time timer (this action is an incrementing action so as to count) for counting the elapsed time elapsed since the current began flowing through the heater-attached catalyst 24 (S107). Then the current processing cycle is finished.

In this operation flow of the subroutine that is the processes shown in FIG. 5A, each of the periodical executions of the subroutine starting from the next processing cycle results in the execution of S101, S102, and S103 successively, and thus it is determined that the electrical current is flowing through the heater-attached catalyst 24 (the XEHC flag is "1"), and S105 is then executed without execution of the S104.

In S105, the value T of the current flow time timer is compared with the Ton obtained in the first processing cycle. The controller 31 executing the steps S101 through 107 is repeated until it is determined that the required current flowing time has elapsed (T≧Ton) in S105.

Then, after it is determined that the required current flowing time has elapsed (T≧Ton) in S105, the electric current flowing through the heater-attached catalyst 24 is then stopped so as to prevent an undesirable excess heating, and thus the XEHC flag is set to "0" (S108). Then, the value T of the current flow time timer is cleared (S109) so as to prepare for the next processing cycle.

Then, heating of the heater-attached catalyst 24 has finished, and thus preparation for purifying the exhaust gas through the catalyst so as to remove undesirable substances included in the exhaust gas has been completed. Then the starter relay is set to ON (S110), the current processing cycle being then finished.

After the internal combustion engine 21 has started, the engine speed has reached a predetermined speed, and then a signal indicating the engine running state is input to the controller 31 from the ECU 34. The controller 31 then causes, as a result of the input of the signal, the flag XSTEF1 that represents the engine running state to set to "0".

Because of the flag XSTEF1 being "0", the execution of the subroutine of FIG. 5A in the processes starting from the next processing cycle results in a determination in S101 that the engine 21 is running, and thus results in maintaining the OFF state of the electric current flowing through the heater-attached catalyst (S111), the current processing cycle then being finished.

The processes employed by the emission control system according to the first embodiment of the present invention mentioned above determine the required current flowing time of the heater-attached catalyst 24 based on the initial temperature of the heater-attached catalyst 24 before the engine starts. In this method, the temperature sensor 29 has to have the ability to measure the temperature of the heater-attached catalyst 24 in the steady state of the engine before the engine starts. Thus, the sensor 29 is not required to have a fast response.

Therefore, the emission control system according to the first embodiment of the present invention can employ a thermistor to act as the temperature sensor 29, which thermistor does not have a fast response, and further, this apparatus can determine the required current flowing time of the heater-attached catalyst 24 accurately.

Figure 6:
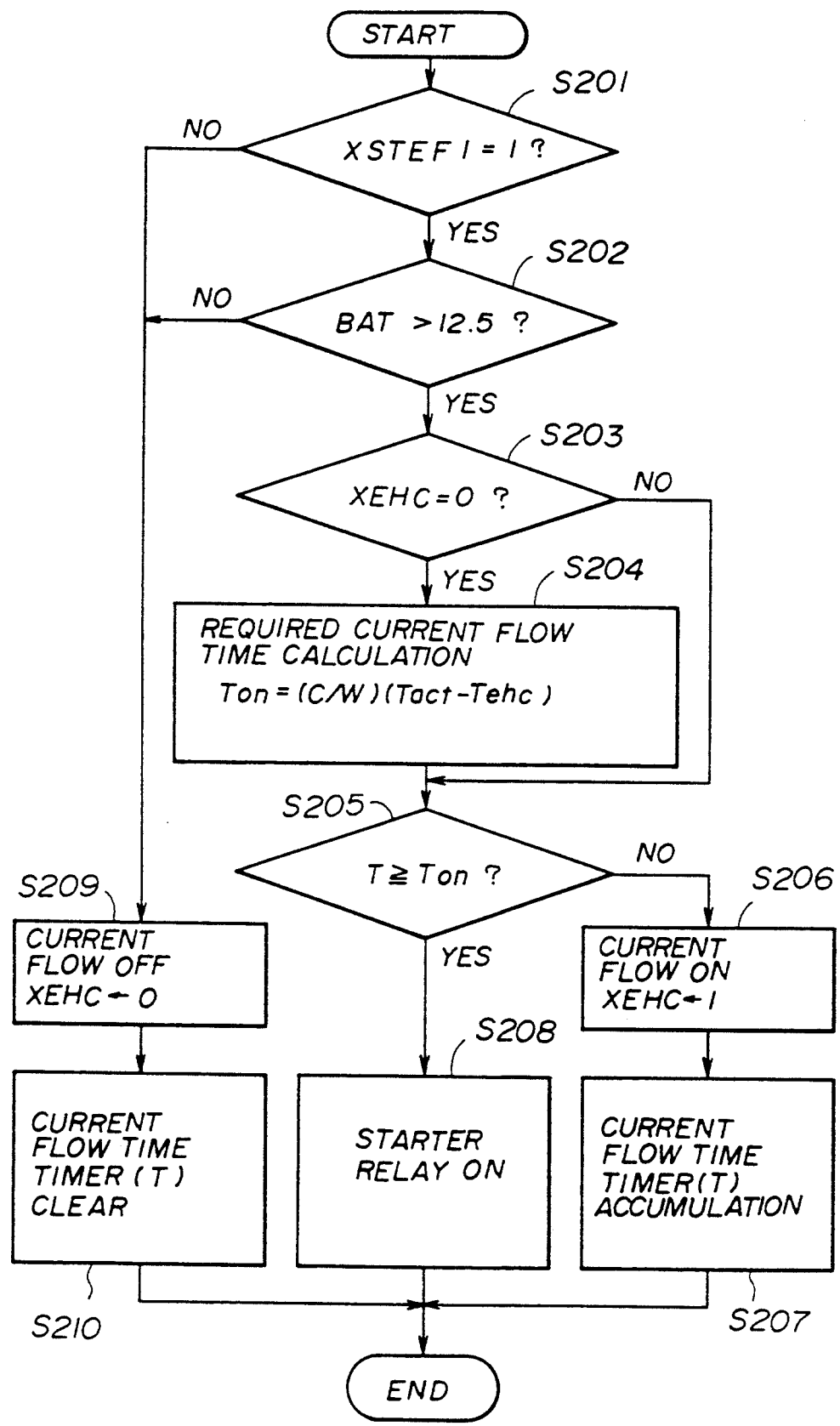
FIG. 6 shows a flow chart of processes executed in an exhaust emission control system according to the second embodiment of the present invention.

The operation flow of processes employed by the emission control system according to the second embodiment of the present invention will be now described with reference FIG. 6. S201 through S207 in FIG. 6, corresponding to S101 through S107 in FIG. 5A respectively, execute the same processes as those executed in S101 through 107 in FIG. 5A, and descriptions for S201 through S207 are thus omitted.

S201 through S207 are executed in each processing cycle until the required current flowing time Ton has elapsed.

In the emission control system according to the second embodiment, in a case where it is determined that the required current flowing time Ton has elapsed in S205, the internal combustion engine 21 is then started while the electric current is flowing through the heater-attached catalyst 24. Thus, the starter relay is switched ON (S208), and the current processing cycle is then finished. In these processes, cranking of the engine 21 is executed while the current flows through the heater-attached catalyst 24.

Then, after the engine 21 is started, the engine speed reaches the predetermined speed, and the XSTEF1 flag then becomes "0" based on the signal obtained from the ECU 34, similarly to the above-mentioned case of the system according to the first embodiment of the present invention. Thus, in the processes starting from the next processing cycle, it is determined in S201 that the engine 21 is in the running state, and S209 is thus executed.

In S209, the current flowing through the heater-attached catalyst 24 is turned OFF state, and further, the flag XEHC that indicates the current flowing state is set to "0". Then the value T of the current flow time timer is cleared (S210) to prepare for the next processing cycle, and thus the current processing cycle is finished.

In the apparatus employing the processes of the system according to the second embodiment of the present invention, the engine 21 is cranked while the electric current is flowing through the heater-attached catalyst 24, and this state is maintained until the engine has started up.

Timing charts for: the temperature of the heater-attached catalyst 24, timing of the current flowing through the catalyst 24, and timing of the cranking by the starter motor for starting the engine, relating to the systems according to the first and the second embodiments of the present invention, will now be described with reference to FIGS. 7A through 7F. Of FIGS. 7A through 7F, FIGS. 7A through 7C are for the system according to the first embodiment, and FIGS. 7C through 7F are for the system according to the second embodiment.

As shown in FIGS. 7B and 7C, the cranking is begun after the current flowing through the heater-attached catalyst 24 has been terminated in the system according to the first embodiment. Thus, as shown in FIG. 7A, the temperature of the heater-attached catalyst 24 is decreasing during the cranking, that is while the starter motor is in the ON state. Thus, obtaining a sufficient catalysis at the time when the engine has started up requires previous increasing of the temperature of the heater-attached catalyst 24 up to a temperature higher than the minimum activating temperature, and there should be an extra range between the increased temperature occurring at the time when the current flowing has been terminated and the starter motor has started and the minimum activating temperature, the extra range allowing the decrease of the temperature of the catalyst 24 during the cranking.

On the other hand, in the case of the system according to the second embodiment, as shown in FIGS. 7E and 7F, the cranking of the engine 21 is executed while the current is flowing through the heater-attached catalyst 24. Thus, as shown in FIG. 7D, only the temperature of the heater-attached catalyst 24 has to reach the activating temperature at the time when the engine starts (driving by the starter motor has finished at the time), and any extra range such as above is not needed. Thus, the corresponding extra heating of the heater-attached catalyst 24 is not needed accordingly.

Therefore, the case of the system according to the second embodiment, in comparison with the case of the system according to the first embodiment, requires a temporary extra load to be borne by the battery 30 because the battery 30 has to bear both the simultaneous loads for the heater-attached catalyst 24 and the starter motor. However, the system according to the second embodiment can eliminate the extra heating of the catalyst 24, and can reduce the time required for increasing the temperature of the catalyst 24 up to the activating temperature range.

Figure 8:
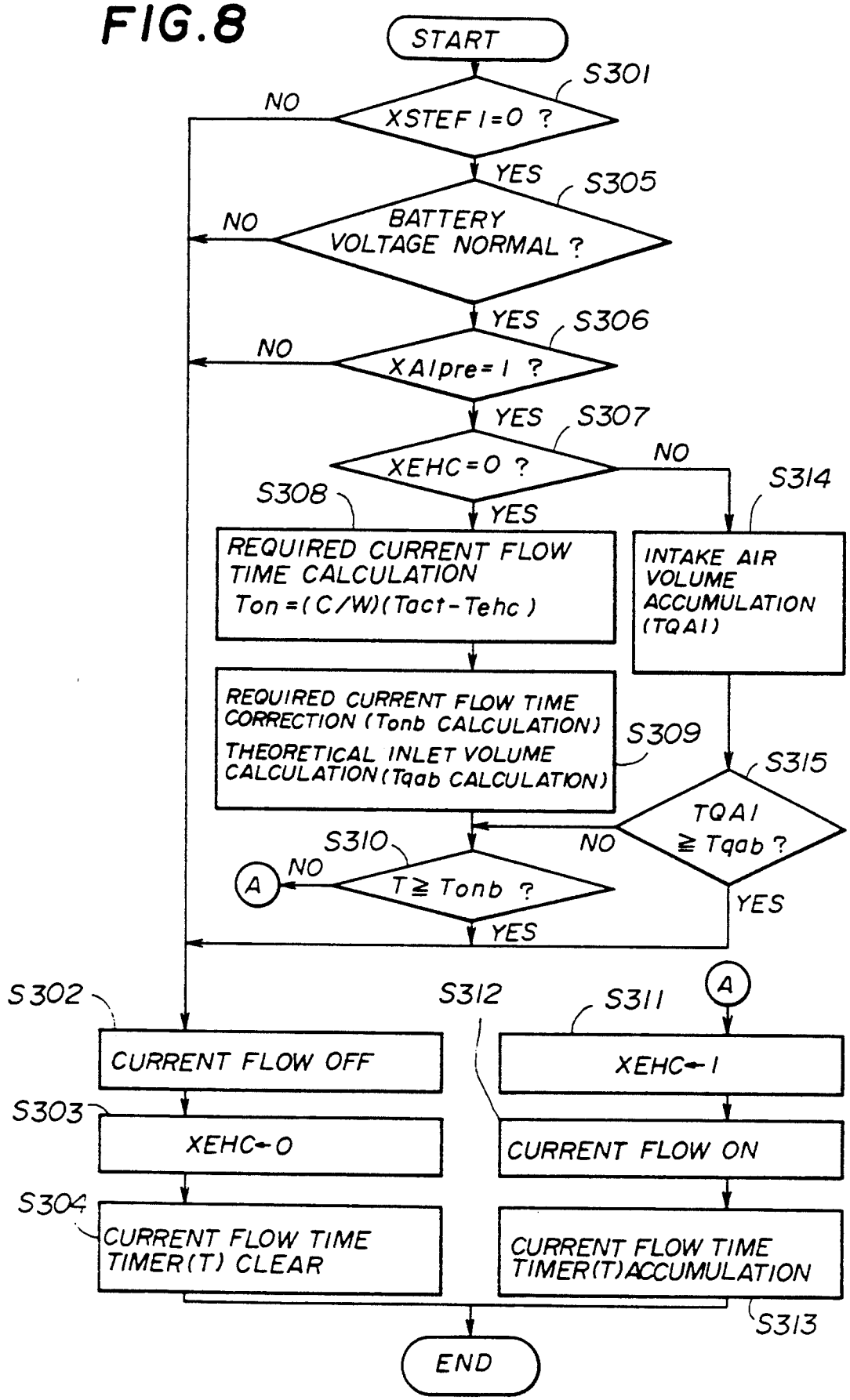
FIG. 8 shows a flow chart of processes executed in an exhaust emission control system according to the third embodiment of the present invention.

The operation flow of processes employed by the exhaust emission control system according to the third embodiment of the present invention will now be described below with reference to FIG. 8. In the processes of FIG. 8, processes using the AI port 23 shown in FIG. 2 and processes of heating the heater-attached catalyst 24 by current flowing therethrough are executed synchronously, after the starting of the engine. The processes of FIG. 8 are particularly effective in a case where the engine is started when the atmosphere temperature is not high enough, in rather in cold temperature conditions, by which processes the exhaust gas can be purified effectively.

The processes of FIG. 8 have a step for inducing secondary air through the AI port 23 soon after the engine 21 starts, in a case where a temperature of the cooling water in the engine 21 is lower than a predetermined temperature. Further, the processes have a step for transferring the corresponding AI request signal from the ECU 34 to the controller 31 in a case where the secondary air induction through the AI port 23 is needed.

After the ignition switch of the engine 21 is turned ON, the processes of FIG. 8 are started. Whether or not the engine 21 is in the running state is determined in S301.

In a case where the engine 21 is in the stopped state (XSTEF1 is "1"), it is determined that the current flowing through the heater-attached catalyst 24 is not needed. Thus, steps S302 through S304 for stopping the current flowing through the heater-attached catalyst 24 are executed and then the current processing cycle is finished, in each processing cycle of the subroutine consisting of the processes of FIG. 8 is started.

S302 causes the current flowing through the heater-attached catalyst 24 to be turned OFF, S303 causes the flag XEHC that indicates the current flowing state to be "0" so as to indicate that the current is not flowing, and S304 clears the value T of the current flowing time timer which value T indicates the current flowing time obtained as a result of accumulating the elapsed current flowing time.

After the engine is started, the flag XSTEF1 becoming "0", it is thus determined that the engine 21 is in the running state (S301). Then, whether or not the output voltage of the battery 30 is normal is determined (S305). In the processes, the output voltage of the battery 30 is determined to be normal when the output voltage is higher than 10.5 V which output voltage has been measured after the starter motor is started.

In a case where the battery output voltage is abnormal (BAT≦10.5), the current flowing through the heater-attached catalyst 24 is stopped so as to protect the battery from the overloading, by S302 through S304 that cause the current flowing through the heater-attached catalyst 24 to be stopped, and then the current processing cycle is finished.

In a case where it is determined that the battery output voltage is normal (BAT>10.5), it is determined (S306) whether or not the AI request signal is being issued. In a case where the AI is not necessary as a result of the determination in S306 (XAIpre flag is "0"), the processes consisting of S302 through S304 for causing the current flowing through the heater-attached catalyst 24 to be stopped are executed, and then the current processing cycle is finished. In a case where the AI execution is necessary (XAIpre flag is "1"), S307 is then executed.

In S307, it is determined, using the flag XEHC, whether or not the current flowing through the heater-attached catalyst 24 has been started. In the first processing cycle after the engine 21 is started, the current flowing through the heater-attached catalyst 21 will not yet have been started. Further, the XEHC flag will have become "0" in S303. Thus, it is determined that the calculation of the required current flowing time is needed to be executed, and then S308 is executed.

A method for calculating the required current flowing time in the processes of the system according to the third embodiment will now be described. The required current flowing time Ton can be obtained as a result of substituting the temperature Tehc of the heater-attached catalyst 24, which temperature Tehc has been measured through the temperature sensor 29 before the engine 21 is started, in the equation (1) used in the processes of the system according to the first embodiment. However, the required current flowing time Ton thus obtained is a time required for increasing the temperature of the heater-attached catalyst 24 up to a predetermined temperature while the engine 21 is in the stopped state.

In the processes of the system according to the third embodiment of the present invention, the engine 21 has already started running when the current flowing through the heater-attached catalyst 24 is started. Thus, the heater-attached catalyst 24 is heated by the exhaust gas from the engine 21. A corrected time is needed during which time the heater-attached catalyst 24 is heated by the heater attached thereto other than by the exhaust gas as mentioned above. The corrected time can be obtained as a result of a correcting the required current flowing time Ton according to the degree by which the heater-attached catalyst 24 is heated by the exhaust gas.

The correction time Tond will be now described with reference to FIG. 9. The more the exhaust gas heats the catalyst 24, the faster the heater-attached catalyst 24 can reach the activating temperature as a result of being heated by both the heater attached to the catalyst 24 and the exhaust gas.

Figure 9:
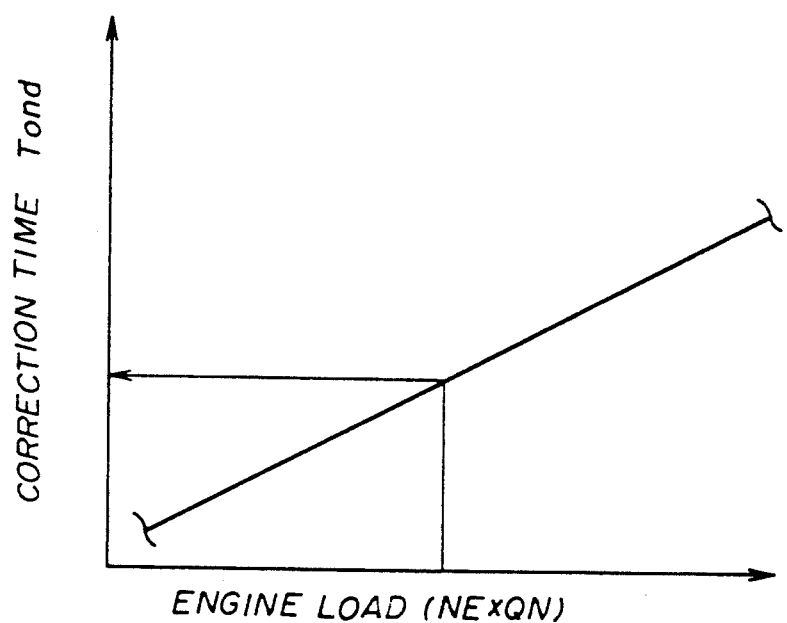
FIG. 9 shows a graph of a relationship between a load born by an internal combustion engine and a correction time for the required current flowing time, which relationship may be employed by the third embodiment of the present invention.

The corrected required current flowing time Tonb is obtained as a result of subtracting the correction time Tond for the heating by the exhaust gas, which Tond is obtained from the FIG. 9, from the original required current flowing time Ton that is required for heating by only the heater attached to the heater-attached catalyst 24 without heating by the exhaust gas.

The correction time Tond is determined depending on the temperature of the exhaust gas and the flow rate of the exhaust gas, and is thus a value approximately proportional to the load borne by the engine. The load borne by the engine is determined without ambiguity depending on a value obtained from the engine speed (NE) being multiplied by the intake air volume (QN) in one cycle of the engine. As shown in FIG. 9, the correction time Tond is proportional to the load NE*QN (the product of NE and QN) borne by the engine. The relationship of FIG. 9 may be previously obtained experimentally. Using the obtained relationship of FIG. 9 makes it easy to determine the correction time Tond corresponding to the loading state of the engine.

In the processes of FIG. of the system according to the third embodiment of the present invention, after the required current flowing time Ton has been obtained by the corresponding calculation, the above-mentioned correction is performed on Ton based on an NE signal and a QN signal transferred from the ECU 34, and an actual current flowing time Tonb (during which the electric current will actually flow through the heater-attached catalyst 24) constituting the corrected time is thus obtained. Further, at the same time as the obtaining the Tonb, a theoretical intake air volume Tqab, that is an air volume that should be inhaled by the engine 21 while the time Tonb is elapsing, is obtained from a corresponding calculation (S309) based on the above NE signal, QN signal, and the current flowing time Tonb.

The Tqab is obtained for the purpose of controlling, in view of the intake air volume, the terminating timing of the heating of the heater-attached catalyst 24. That is, the current flowing through the heater-attached catalyst 24 is terminated when the actual intake air volume, inhaled by the engine 21, which intake air volume has been calculated by accumulating the intake air flow, has reached the Tqab, even when the required current flowing time Tonb has not yet elapsed. Such a control method as described above can control the current flowing time for the electric current flowing through the heater-attached catalyst 24 efficiently even when the load borne by the engine varies.

After the above mentioned calculations have been executed, it is determined (S310), by reading the value T of the current flowing time timer, whether or not the required current flowing time Tonb has elapsed. In a case where the current processing cycle is the first cycle since the current flowing has started flowing, it is thus determined that the required current flowing time Tonb has not yet elapsed (T<Tonb), and then S311 is executed.

S311 causes the flag XEHC to become "1" so as to indicate that the electric current is flowing through the heater-attached catalyst 24. Then, the current flowing through the heater-attached catalyst 24 is already ON, and then it is turned ON (S312). Then, a predetermined value is added to the value T of the current flowing time timer so as to accumulate the actual current flowing time (S313), and then the current processing cycle is finished.

Then, the next processing cycle executes S301 through 306, and reaches S307. Then, it is determined that the electric current is flowing through the heater-attached catalyst 24 (the XEHC flag is "1"), and S314 is executed.

S314 accumulates the air volume actually inhaled by the engine 21 so as to control, in view of the intake air volume, the current flowing time, that is the heating time during which the heater-attached catalyst 24 is heated, as mentioned above. The value obtained as a result of S314 is designated TQAI.

Then, the TQAI is compared to the theoretical intake air volume Tqab (S315). When the engine 21 has already inhaled the theoretical intake air volume Tqab (TQAI≧Tqab), S303 through S305 are executed because the heater-attached catalyst 24 does not need to be further heated, and the current processing cycle finished.

On the other hand, when the engine 21 has not yet inhaled the theoretical air intake volume Tqab (TQAI<Tqab), S310 is executed so that it is determined whether or not the required current flowing time Tonb has elapsed. When the required current flowing time Tonb has elapsed, S302 through S304 are executed, and the current processing cycle is then finished.

When the required current flowing time Tonb has not yet elapsed, it is determined that the heating of the heater-attached catalyst is not to be terminated, S311 through S313 are then executed, and the current processing cycle is finished. Then, in the processes from the next processing cycle, S301 through S307, S314, S315, and S310 through S313 are executed repeatedly until either the intake air volume of the engine 21 reaches the theoretical intake air volume Tqab or the actual current flowing time reaches the required current flowing time Tonb.

The processes of the system according to the third embodiment of the present invention heat the heater-attached catalyst 24 while the engine is in the running state and the processes do not need an independently determined required current flowing time for heating the catalyst. Further, the processes correct the required current flowing time for heating the catalyst 24 based on the load borne by the engine even when the engine is in the running state, and an efficient heating of the catalyst can be thus realized.

Further, the processes of the system according to the third embodiment of the present invention control, in view of the intake air volume, the terminating timing of the current flowing through the catalyst, based on the intake air volume at time since soon after the engine starts. Thus, when the exhaust gas volume has increased as a result of the load borne by the engine 21 after the engine has started, the current flowing through the catalyst is terminated because of the intake air volume having reached the theoretical intake air volume even when the required current flowing time Tonb has not elapsed yet. Thus, even when the heater-attached catalyst 24 reaches the predetermined temperature faster than expected, the actual current flowing time is then reduced correspondingly, and an efficient heating of the catalyst can be thus realized.

The method for controlling of the heat energy to be applied to the heat-attached catalyst 24 is not limited to the methods of the above first through third embodiments of the present invention. Controlling the heat energy, for example, by adjustment of the electric current flowing the heat-attached catalyst 24 may be permitted.

Figure 5B:
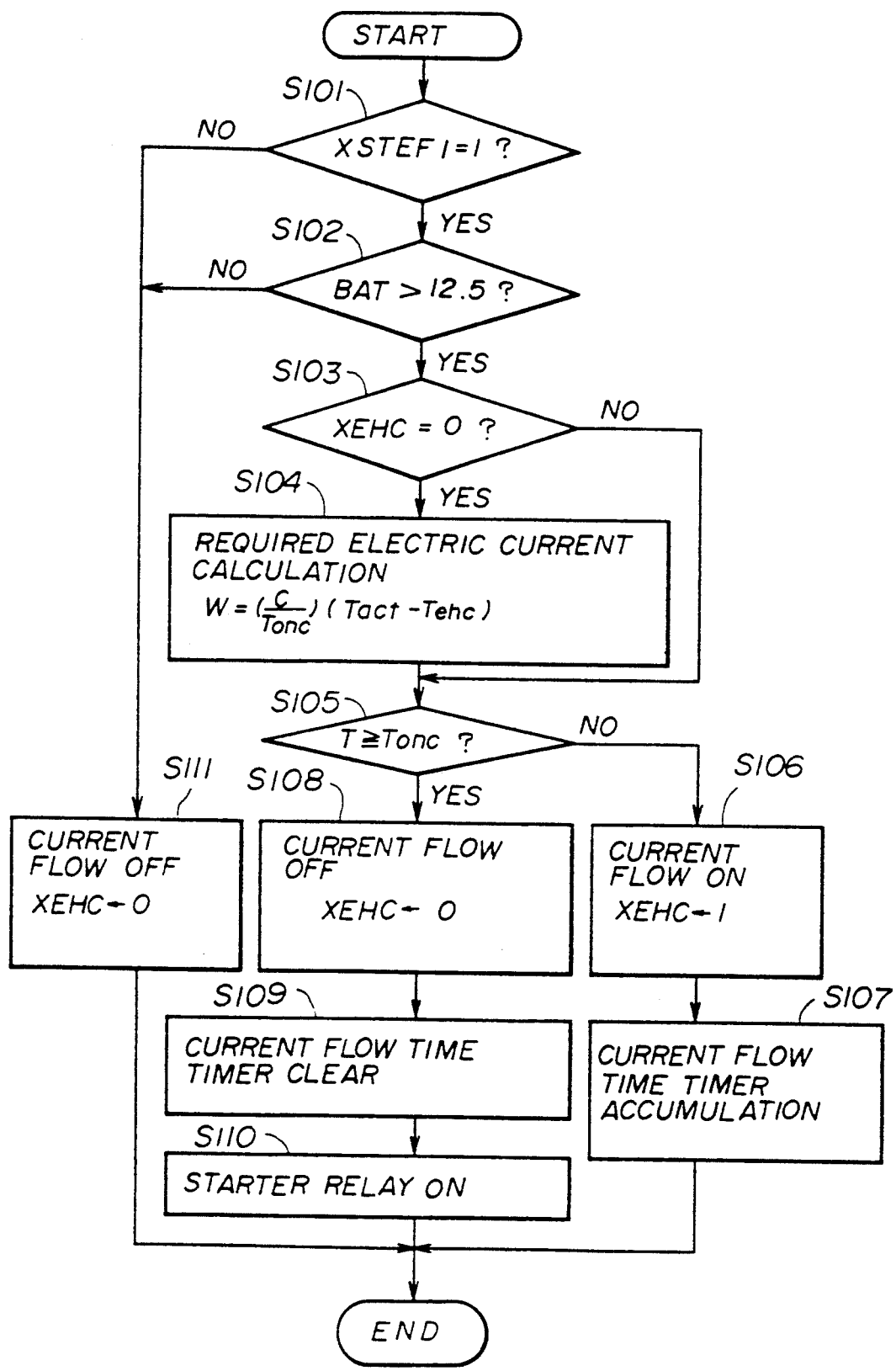
FIG. 5B shows a flow chart of processes executed in an exhaust emission control system according to the fourth embodiment of the present invention.

The operation flow of the processes employed by the emission control system according to a fourth embodiment of the present invention will be described now with reference to FIG. 5B. In the operation flow of the fourth embodiment of the present invention show in FIG. 5B, all steps are substantially the same as the steps of the operation flow of the first embodiment of the present invention shown in FIG. 5A, except for S105A and S106A of FIG. 5B being different from the corresponding S105 and S106 of FIG. 5A. The same reference numerals as those of FIG. 5A are given to the substantially same steps of FIG. 5B and description for the steps will be omitted.

In the fourth embodiment of the present invention, a time during which the electric current is to flow is to be constant as a predetermined time Tonc. A required electric current to flow during the predetermined time Tonc through the heater-attached catalyst 24 (starting in S106 and ending in S108) is obtained by a corresponding calculation in S104A. This calculation is executed based on a required heating energy to be applied to the heater-attached catalyst 24 so as to obtain the desired catalysts of the catalyst, which energy is applied by flowing the electric current to be obtained in S104A during the predetermined time Tonc. The required electric current is obtained based on the following equation (2):

$$W = (C/Tonc) \cdot (Tact - Tehc) \quad (2);$$

where: the W represents the electric power consumption for heating the catalyst; the C represents the heat capacity of the catalyst; the Tonc represents the predetermined current flowing time; the Tact represents the activating temperature; and the Tehc represents the temperature of the catalyst means detected through the temperature detecting means before the internal combustion engine starts. The required electric current is obtained as a result of dividing the W by the voltage to be applied so as to flow the required electric current to the heater of the heater-attached catalyst 24. It is then determined in S105A whether or not the predetermined time Tonc has elapsed.

In the fourth embodiment according to the present invention, the adjustment of the electric current to flow the heater-attached catalyst 24 results in the heater-attached catalyst 24 being heated so as to reach the activating temperature thereof during the constant predetermined time not depending on the initial temperature of the catalyst 24 before heating.

The above-mentioned features of the present invention enable the temperature of the heater-attached catalyst to be increased up to near the predetermined temperature every time the engine is started as a result of heating the heater-attached catalyst for the required current flowing time, obtained from the temperature of the heater-attached catalyst before the engine starts, or the actual current flowing time determined by the other methods employed by the systems according to the third embodiment or the fourth embodiment of the present invention.

Therefore, the exhaust emission control system employing the processes according to the present invention enables measurement of the temperature of the catalyst at the steady state of the engine. Thus, a temperature sensor having a relatively lower grade in response time thereof, such as a thermistor, can be employed in the exhaust emission control system. Further, the temperature sensor employed by the exhaust emission control system does not need to be directly exposed to the exhaust gas. Thus, the durability of the temperature sensor can be improved, and the reliability of the exhaust emission control system can also be improved.

Further, the present invention is not limited to the above described embodiments, and variations and modifications may be made without departing from the scope of the present invention.

What is claimed is:

1. An exhaust emission control system comprising:

catalyst means for purifying an exhaust gas exhaled from an internal combustion engine by catalysis thereof as a result of the exhaust gas passing therethrough;

heating means for heating said catalyst means so as to cause said catalyst means to perform the desired catalysis;

temperature detecting means for detecting the temperature of said catalyst means;

deriving means for deriving a required heat energy quantity to be applied to said catalyst means, by which energy quantity the temperature of said catalyst means reaches an activating temperature so as to perform the desired catalysis, according to the temperature of said catalyst means detected through said temperature detecting means before said internal combustion engine starts; and heat control means for causing said heating means to stop the heating of said catalyst means after the heat energy quantity applied to said catalyst means has reached the required heat energy quantity which has been derived by said deriving means.

2. An exhaust emission control system according to claim 1, wherein:

said driving means derives a required heating time, during which the temperature of said catalyst means reaches an activating temperature so as to perform the desired catalysis, according to the temperature of said catalyst means detected through said temperature detecting means before said internal combustion engine starts; and said heat control means causes said heating means to stop the heating of said catalyst means after the required heating time has elapsed since the start of heating of said catalyst means by said heating.

3. An exhaust emission control system according to claim 1, wherein:

said heating means comprises current flowing means for causing electric current to flow through a heater so that said heater heats said catalyst means so as to cause said catalyst means to perform the desired catalysis;

said deriving means derives a required current flowing time, during which the temperature of said catalyst means reaches an activating temperature so as to perform the desired catalysis, according to the temperature of said catalyst means detected through said temperature detecting means before said internal combustion engine starts; and said heat control means comprises current control means for causing said current flowing means to stop causing electric current to flow through said heater after the required current flowing time has elapsed since the start of electric current flow through said heater caused by said current flowing means.

4. The exhaust emission control system according to claim 3, further comprising required current flowing time deriving means for deriving said required current flowing time Ton as a result of the following equation (1):

$$Ton = (C/W) \cdot (Tact - Tehc) \qquad (1)$$

where: said W represents the electric power consumption for heating of said catalyst; said C represents the heat capacity of said catalyst; said Tact represents said activating temperature; and said Tehc represents the temperature of said catalyst means detected through said temperature detecting means before said internal combustion engine starts.

5. The exhaust emission control system according to claim 3, wherein a starter motor for cranking said internal combustion engine is started after said current control means causes said current flowing means to stop causing the electric current to flow through said heater.

6. The exhaust emission control system according to claim 3, wherein a starter motor for cranking said internal combustion engine is started while said current flowing means causes the electric current to flow through said heater.

7. The exhaust emission control system according to claim 3, further comprising current flowing time correcting means for correcting the required current flowing time according to a load borne by said internal combustion engine.

8. The exhaust emission control system according to claim 3, further comprising intake air volume deriving means for deriving an accumulated intake air volume inhaled by said internal combustion engine since said internal combustion engine started;

and wherein said current control means causes said current flowing means to stop causing electric current to flow through said heater when the accumulated intake air volume derived by said intake air volume deriving means reaches a predetermined value.

9. The exhaust emission control system according to claim 1, wherein said deriving means derives a required heating intensity to be applied to said catalyst means, application of which heat intensity during a predetermined time causes the temperature of said catalyst means to reach an activating temperature so as to perform the desired catalysis, according to the temperature of said catalyst means detected through said temperature detecting means before said internal combustion engine starts; and heat control means for causing said heating means to stop the heating of said catalyst means after the required heat intensity has been applied to said catalyst means for said predetermined time.

10. The exhaust emission control system according to claim 1, wherein:

said deriving means derives a required electric current, the flow of which electric current during a predetermined current flowing time through a heater causes the temperature of said catalyst means to reach an activating temperature so as to perform the desired catalysis, according to the temperature of said catalyst means detected through said temperature detecting means before said internal combustion engine starts;

said heating means comprises current flowing means for causing the required electric current, which has been derived by said deriving means, to flow through said heater so that said heater heats said catalyst means so as to cause said catalyst means to perform the desired catalysis; and said heat control means comprises current control means for causing said current flowing means to stop causing the required electric current to flow through said heater after the predetermined current flowing time has elapsed since the start of the required electric current flow through said heater caused by said current flowing means.

11. The exhaust emission control system according to claim 10, wherein said deriving means derives the required electric current based on the following equation (2):

$$W = (C/Tonc) \cdot (Tact - Tehc) \qquad (2);$$

where: said W represents the electric power consumption for heating said catalyst; said C represents the heat capacity of said catalyst; said Tonc represents said predetermined current flowing time; said Tact represents said activating temperature; and said Tehc represents the temperature of said catalyst means detected through said temperature detecting means before said internal combustion engine starts.

12. An exhaust emission control system comprising:

catalyst means for purifying an exhaust gas exhaled from an internal combustion engine by catalysis thereof as a result of the exhaust gas passing therethrough;

current flowing means for causing electric current to flow through a heater so that said heater heats said catalyst means so as to cause said catalyst means to perform the desired catalyst;

intake air volume deriving means for deriving an accumulated intake air volume inhaled by said internal combustion engine since said internal combustion engine started; and and current control means for causing said current flowing means to stop causing electric current to flow through said heater when the accumulated intake air volume obtained by said intake air volume deriving means reaches a predetermined value.

13. The exhaust emission control system according to claim 12, wherein said intake air volume deriving means derives the accumulated intake air volume according to the load borne by said internal combustion engine.

14. The exhaust emission control system according to claim 13, wherein said intake air volume deriving means obtains a value corresponding to the load borne by said internal combustion engine as a result of the speed of said internal combustion engine being multiplied by the intake air volume inhaled by said internal combustion engine in one cycle thereof.

15. An exhaust emission control method comprising steps of:
  (a) purifying an exhaust gas exhaled from an internal combustion engine by catalysis with a catalyst as a result of the exhaust gas passing through said catalyst;
  (b) heating said catalyst so as to cause said catalyst to perform the desired catalysis;
  (c) detecting the temperature of said catalyst;
  (d) deriving a required heat energy quantity to be applied to said catalyst means, by which energy quantity the temperature of said catalyst reaches an activating temperature so as to perform the desired catalysis, according to the temperature of said catalyst detected through said temperature detecting step (c) before said internal combustion engine starts; and
  (e) stopping the heating of said catalyst after the heat energy quantity having been applied to said catalyst means has reached said required heat energy quantity which has been obtained in said deriving step (d).

16. An exhaust emission control method according to claim 15, wherein:
  said deriving step (d) derives a required heating time, during which the temperature of said catalyst reaches an activating temperature so as to perform the desired catalysis, according to the temperature of said catalyst detected through said temperature detecting step (c) before said internal combustion engine starts; and
  said heat control step (e) stops the heating of said catalyst after the required heating time has elapsed since the start of heating of said catalyst in said heating step (b).

17. An exhaust emission control method according to claim 15, wherein:
  said heating step (b) comprises a step of causing electric current to flow through a heater so that said heater heats said catalyst so as to cause said catalyst to perform the desired catalysis;
  said deriving step (d) derives a required current flowing time, during which the temperature of said catalyst reaches an activating temperature so as to perform the desired catalysis, according to the temperature of said catalyst detected through said temperature detecting step (c) before said internal combustion engine starts; and
  said heat control step (e) comprises a step of stopping causing electric current to flow through said heater after the required current flowing time has elapsed since the start of electric current flow through said heater is caused in said current flowing step (b).

18. The exhaust emission control method according to claim 17, further comprising a step (f) of deriving said required current flowing time Ton as a result of the following equation (1):

$$Ton = (C/W) \cdot (Tact - Tehc) \qquad (1);$$

where: said W represents the electric power consumption for heating said catalyst; said C represents the heat capacity of said catalyst; said Tact represents said activating temperature; and said Tehc represents the temperature of said catalyst detected through said temperature detecting step (c) before said internal combustion engine starts.

19. The exhaust emission control method according to claim 17, wherein a starter motor for cranking said internal combustion engine is started after said current control step (e) stops causing the electric current to flow through said heater.

20. The exhaust emission control method according to claim 17, wherein a starter motor for cranking said internal combustion engine is started while current is flowing through said heater as a result of said current flowing step (b).

21. The exhaust emission control method according to claim 17, further comprising a step (g) of correcting the required current flowing time according to the load borne by said internal combustion engine.

22. The exhaust emission control method according to claim 17, further comprising a step (h) deriving an accumulated intake air volume inhaled by said internal combustion engine since said internal combustion engine started;
  and wherein said current control step (e) stops causing electric current to flow through said heater when the accumulated intake air volume derived by said intake air volume deriving step (h) reaches a predetermined value.

23. The exhaust emission control method according to claim 15, wherein:
  said deriving step (d) derives a required heat intensity, application of which heat intensity during a predetermined time to said catalyst means causes the temperature of said catalyst to reach an activating temperature so as to perform the desired catalysis, according to the temperature of said catalyst detected through said temperature detecting step (c) before said internal combustion engine starts; and
  said heat control means (e) stops applying the heat intensity to said catalyst after said predetermined time has elapsed.

24. An exhaust emission control method according to claim 15, wherein:
  said deriving step (d) derives a required electric current, the flow of which electric current during a predetermined current flowing time through a heater causes the temperature of said catalyst to reach an activating temperature so as to perform the desired catalysis, according to the temperature of said catalyst detected through said temperature detecting step (c) before said internal combustion engine starts; and
  said heating step (b) comprises a step of causing the required electric current, which has been derived by said deriving step (d), to flow through said heater so that said heater heats said catalyst so as to cause said catalyst to perform the desired catalysis; and
  said heat control step (e) comprises a step of stopping causing the required electric current to flow through said heater after the required electric current has flowed through said heater for said predetermined current flowing time.

25. The exhaust emission control method according to claim 24, wherein said deriving step (d) derives the required electric current based on the following equation (2):

$$W = (C/Tonc) \cdot (Tact - Tehc) \qquad (2);$$

where: said W represents the electric power consumption for heating said catalyst; said C represents the heat capacity of said catalyst; said Tonc represents said predetermined current flowing time; said Tact represents said activating temperature; and said Tehc represents the temperature of said catalyst means detected through said temperature detecting means before said internal combustion engine starts.

26. An exhaust emission control method comprising steps of:
(i) purifying an exhaust gas exhaled from an internal combustion engine by a catalysis with a catalyst as a result of the exhaust gas passing therethrough;
(j) causing electric current to flow through a heater so that said heater heats said catalyst so as to cause said catalyst to perform the desired catalysis;
(k) deriving an accumulated intake air volumes inhaled by said internal combustion engine since said internal combustion engine started; and
(l) stopping causing electric current to flow through said heater when the accumulated intake air volume obtained by said intake air volume deriving step (k) reaches a predetermined value.

27. The exhaust emission control method according to claim 26, wherein said intake air volume deriving step (k) derives the accumulated intake air volume according to the load borne by said internal combustion engine.

28. The exhaust emission control method according to claim 27, wherein said intake air volume deriving step (k) obtains a value corresponding to the load borne by said internal combustion engine as a result of the speed of said internal combustion engine being multiplied by the intake air volume inhaled by said internal combustion engine in one cycle thereof.

* * * * *